(12) United States Patent
Shirasawa et al.

(10) Patent No.: US 9,180,410 B2
(45) Date of Patent: Nov. 10, 2015

(54) EXHAUST PURIFICATION DEVICE FOR INTERNAL COMBUSTION ENGINE

(75) Inventors: Takeru Shirasawa, Susono (JP); Makoto Ogiso, Mishima (JP); Yoshito Nogi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/345,533

(22) PCT Filed: Sep. 20, 2011

(86) PCT No.: PCT/JP2011/071359
§ 371 (c)(1),
(2), (4) Date: Mar. 18, 2014

(87) PCT Pub. No.: WO2013/042195
PCT Pub. Date: Mar. 28, 2013

(65) Prior Publication Data
US 2014/0363341 A1 Dec. 11, 2014

(51) Int. Cl.
*B01D 53/94* (2006.01)
*F01N 3/20* (2006.01)
*F01N 3/035* (2006.01)

(52) U.S. Cl.
CPC ............ *B01D 53/9495* (2013.01); *F01N 3/035* (2013.01); *F01N 3/2066* (2013.01);
(Continued)

(58) Field of Classification Search
CPC ... F01N 3/2066; F01N 3/035; F01N 2560/05; F01N 2610/02; F01N 2610/1493; F01N 2900/1404; F01N 2900/1411; F01N 2900/0408; B01D 53/9418; B01D 53/9445; B01D 53/9477; B01D 53/9413; B01D 2258/012; B01D 53/9495; B01D 53/9409; B01D 2251/2067; G01M 15/102
USPC .......................................................... 700/266
See application file for complete search history.

(56) References Cited

U.S. PATENT DOCUMENTS

2010/0024390 A1* 2/2010 Wills et al. ...................... 60/274
2010/0024393 A1* 2/2010 Chi et al. ......................... 60/276
(Continued)

FOREIGN PATENT DOCUMENTS

JP 2009-085172 A 4/2009
JP 2010-112230 A 5/2010
(Continued)

OTHER PUBLICATIONS

International Preliminary Report on Patentability for PCT/JP2011/071359 dated Mar. 20, 2014.

*Primary Examiner* — Shogo Sasaki
(74) *Attorney, Agent, or Firm* — Sughrue Mion, PLLC

(57) ABSTRACT

A decrease in determination accuracy on filter trouble due to a decrease in detection accuracy of a PM sensor is restricted. A filter, a selective reduction type NOx catalyst provided on a downstream of the filter, the PM sensor detecting an amount of PM on a downstream of the selective reduction type NOx catalyst, and a removal section conducting a process for removing a reducing agent attached to the PM sensor in a case where at least one of conditions is satisfied that a temperature of the selective reduction type NOx catalyst is equal to or lower than a threshold, that a temperature of the exhaust is equal to or lower than a threshold, that a flow rate of the exhaust is equal to or higher than a threshold, and that an adsorption amount of the reducing agent in the selective reduction type NOx catalyst is equal to or larger than a threshold are included.

9 Claims, 11 Drawing Sheets

(52) U.S. Cl.
CPC ..... *B01D53/9409* (2013.01); *B01D 2251/2067* (2013.01); *F01N 2560/05* (2013.01); *F01N 2610/02* (2013.01); *F01N 2610/1493* (2013.01); *F01N 2900/0408* (2013.01); *F01N 2900/1404* (2013.01); *F01N 2900/1411* (2013.01); *Y02T 10/24* (2013.01)

(56) References Cited

U.S. PATENT DOCUMENTS

| | | | |
|---|---|---|---|
| 2010/0024397 A1* | 2/2010 | Chi et al. | 60/285 |
| 2010/0223908 A1* | 9/2010 | Solbrig et al. | 60/276 |
| 2010/0293925 A1* | 11/2010 | Lahr et al. | 60/276 |
| 2010/0319316 A1* | 12/2010 | Kasahara | 60/273 |
| 2011/0061372 A1* | 3/2011 | Levijoki et al. | 60/286 |
| 2011/0146239 A1* | 6/2011 | Handler et al. | 60/274 |

FOREIGN PATENT DOCUMENTS

| | | |
|---|---|---|
| JP | 2010-229957 A | 10/2010 |
| JP | 2011-080439 A | 4/2011 |
| JP | 2013-096285 A | 5/2013 |

* cited by examiner

FIG. 10

|  |  | CATALYST TEMPERATURE | | | |
|---|---|---|---|---|---|
|  |  | Y | • | • | • |
| REDUCING AGENT AMOUNT | X | a | • | • | • |
|  | • | b | • | • | • |
|  | • | • | • | • | • |
|  | • | • | • | • | • |

FIG.11

|  |  | NH₃ ADSORPTION RATE | | | |
|---|---|---|---|---|---|
|  |  | Y | · | · | · |
| Ga | X | a | · | · | · |
|  | · | b | · | · | · |
|  | · | · | · | · | · |
|  | · | · | · | · | · |

F I G . 13
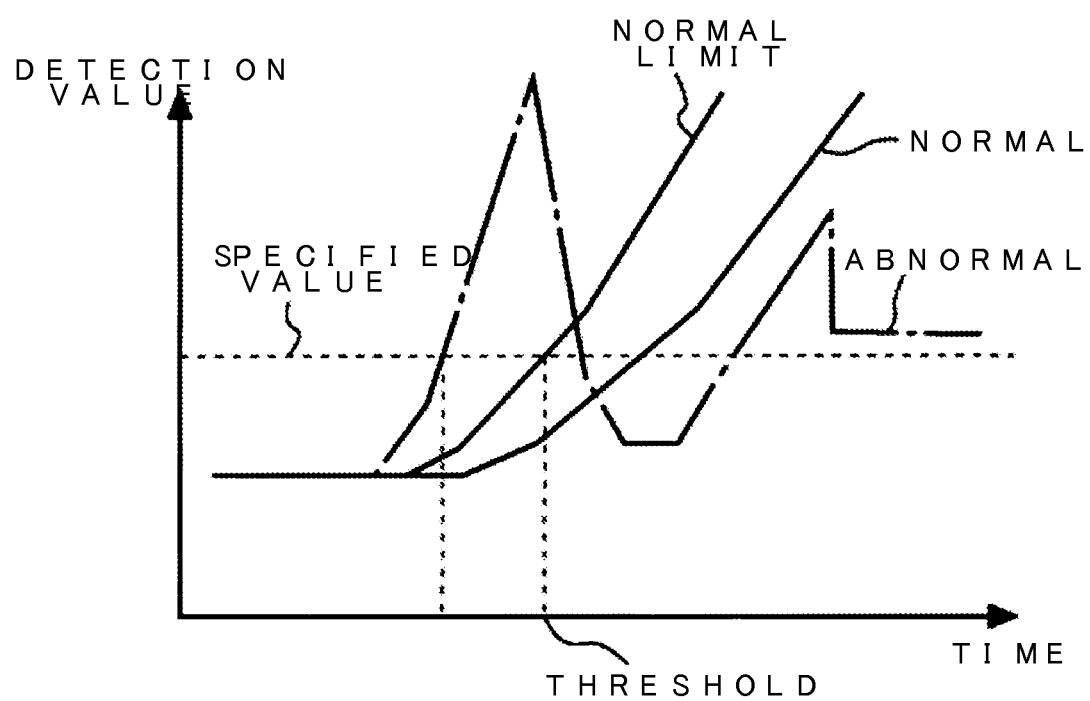

EXHAUST PURIFICATION DEVICE FOR INTERNAL COMBUSTION ENGINE

TECHNICAL FIELD

The present invention relates to an exhaust purification device for an internal combustion engine.

BACKGROUND ART

A technique (for example, see Patent Document 1) has been known that prohibits supply of an aqueous urea solution when an accumulation amount of intermediate products that are produced in a reaction from urea to ammonia in an exhaust passage reaches an upper limit amount in an exhaust purification device that supplies urea to a selective reduction type NOx catalyst (also simply referred to as "NOx catalyst" hereinafter). According to the technique, a reducing agent can be supplied to the NOx catalyst until the accumulation amount of the intermediate products in the exhaust passage reaches the upper limit amount.

Incidentally, a filter for collecting particulate matters (also simply referred to "PM" hereinafter) may be installed in the exhaust passage. In addition, a PM sensor that detects a PM amount in the exhaust is installed for determination on trouble of the filter. It may become difficult to accurately detect the PM amount when the intermediate products attach to an electrode or a cover of the PM sensor. This may decrease accuracy of a determination on filter trouble.

PRIOR ART DOCUMENTS

Patent Document

Patent Document 1: Japanese Patent Application Publication No. 2009-085172 (JP 2009-085172 A)

SUMMARY OF THE INVENTION

Problem to be Solved by the Invention

The present invention has been made in consideration of the above problems, and an object thereof is to restrict a decrease in accuracy in a determination on filter trouble due to a decrease in detection accuracy of a PM sensor.

Means for Solving the Problem

To achieve this object, an exhaust purification device for an internal combustion engine in accordance with the present invention includes: a filter that is provided in an exhaust passage in the internal combustion engine and collects particulate matters in the exhaust; a selective reduction type NOx catalyst that is provided on a downstream of the filter and reduces NOx by a supplied reducing agent; a supply device that supplies the reducing agent to the selective reduction type NOx catalyst from an upstream of the selective reduction type NOx catalyst; a PM sensor that detects an amount of the particulate matters in the exhaust on a downstream of the selective reduction type NOx catalyst; and a removal section that conducts a process for removing the reducing agent that attaches to the PM sensor in a case where at least one of conditions is satisfied that a temperature of the selective reduction type NOx catalyst is equal to or lower than a threshold, that a temperature of the exhaust is equal to or lower than a threshold, that a flow rate of the exhaust is equal to or higher than a threshold, and that an adsorption amount of the reducing agent in the selective reduction type NOx catalyst is equal to or larger than a threshold.

Here, when the reducing agent is supplied from the supply device, a portion of the reducing agent may pass through the selective reduction type NOx catalyst and attach to the PM sensor depending on states of the exhaust and the selective reduction type NOx catalyst. When the reducing agent attaches to the PM sensor, an output value of the PM sensor changes, resulting in difficulty in accurate detection of the PM. However, the removal section conducts the process for removing the reducing agent that attaches to the PM sensor in a case where the reducing agent passes through the selective reduction type NOx catalyst. Accordingly, because the change in the detection value of the PM sensor due to the reducing agent can be restricted, a decrease in the accuracy in the determination on the filter trouble can be restricted.

In cases where the temperature of the selective reduction type NOx catalyst is low or the temperature of the exhaust is low, where the flow rate is high, and where the amount of the reducing agent that attaches to the selective reduction type NOx catalyst is large, the reducing agent can pass through the selective reduction type NOx catalyst.

When the temperature of the selective reduction type NOx catalyst decreases, the reducing agent becomes less likely to react in the selective reduction type NOx catalyst, thus facilitating the reducing agent to pass through the selective reduction type NOx catalyst. In other words, the temperature of the selective reduction type NOx catalyst correlates with the amount of the reducing agent that passes through the selective reduction type NOx catalyst. Further, when the temperature of the exhaust on an upstream of the selective reduction type NOx catalyst decreases, the reducing agent becomes less likely to react in the selective reduction type NOx catalyst, thus facilitating the reducing agent to pass through the selective reduction type NOx catalyst. In other words, the temperature of the exhaust correlates with the amount of the reducing agent that passes through the selective reduction type NOx catalyst.

Further, when the flow rate of the exhaust that passes through the selective reduction type NOx catalyst increases, the reducing agent becomes more likely to pass through the selective reduction type NOx catalyst before the reaction of the reducing agent finishes in the selective reduction type NOx catalyst. In other words, the flow rate of the exhaust correlates with the amount of the reducing agent that passes through the selective reduction type NOx catalyst. Further, when a reducing agent amount that is adsorbed on the selective reduction type NOx catalyst increases, the reducing agent becomes less likely to adsorb in the selective reduction type NOx catalyst, thus facilitating the reducing agent to pass through the selective reduction type NOx catalyst. In other words, the adsorption amount of the reducing agent correlates with the amount of the reducing agent that passes through the selective reduction type NOx catalyst.

Therefore, the process for removing the reducing agent is conducted because the reducing agent may attach to the PM sensor in a case where at least one of the conditions is satisfied that the temperature of the selective reduction type NOx catalyst is equal to or lower than the threshold, that the temperature of the exhaust is equal to or lower than the threshold, that the flow rate of the exhaust is equal to or higher than the threshold, and that the adsorption amount of the reducing agent in the selective reduction type NOx catalyst is equal to or larger than the threshold. Consequently, because the change in the detection value due to the reducing agent that attaches to the PM sensor can be restricted, the decrease in the accuracy in the determination on the filter trouble can be restricted.

The threshold of the temperature of the selective reduction type NOx catalyst that is described herein can be an upper limit value of the temperature at which the reducing agent passes through the selective reduction type NOx catalyst or an upper limit value of the temperature at which the reducing agent attaches to the PM sensor. Further, the temperature of the selective reduction type NOx catalyst at which the reducing agent amount that attaches to the PM sensor falls in an allowable range may be a threshold.

Further, the threshold of the temperature of the exhaust can be an upper limit value of the temperature at which the reducing agent passes through the selective reduction type NOx catalyst or an upper limit value of the temperature at which the reducing agent attaches to the PM sensor. Further, the temperature of the exhaust at which the reducing agent amount that attaches to the PM sensor falls in the allowable range may be a threshold.

Further, the threshold of the flow rate of the exhaust can be a lower limit value of the flow rate at which the reducing agent passes through the selective reduction type NOx catalyst or a lower limit value of the flow rate at which the reducing agent attaches to the PM sensor. Further, the flow rate at which the reducing agent amount that attaches to the PM sensor falls in the allowable range may be a threshold. A flow speed of the exhaust may be used instead of the flow rate of the exhaust.

Further, the threshold of the adsorption amount of the reducing agent can be a lower limit value of the adsorption amount in which the reducing agent passes through the selective reduction type NOx catalyst or a lower limit value of the adsorption amount in which the reducing agent attaches to the PM sensor. Further, the adsorption amount in which the reducing agent amount that attaches to the PM sensor falls in the allowable range may be a threshold. An adsorption rate of the reducing agent in the selective reduction type NOx catalyst may be used instead of the adsorption amount of the reducing agent in the selective reduction type NOx catalyst. This adsorption rate is a value obtained by dividing the adsorbed reducing agent amount by a maximum adsorbable reducing agent amount.

The process for removing the reducing agent that attaches to the PM sensor is performed by increasing the temperature of the PM sensor, for example. For example, the temperature of the PM sensor is increased by increasing the temperature of the exhaust.

The reducing agent includes a substance that is supplied from the supply device, a substance that is finally produced from the substance supplied from the supply device, and intermediate products that are produced in reactions from the substance supplied from the supply device to the finally produced substance. Any of those reacts with NOx in the selective reduction type NOx catalyst and reduces the NOx.

Further, the removal section conducts the process for removing the reducing agent that attaches to the PM sensor regardless of whether or not the reducing agent actually attaches to the PM sensor in a case where at least one of the conditions is satisfied that the temperature of the selective reduction type NOx catalyst is equal to or lower than the threshold, that the temperature of the exhaust is equal to or lower than the threshold, that the flow rate of the exhaust is equal to or higher than the threshold, and that the adsorption amount of the reducing agent in the selective reduction type NOx catalyst is equal to or larger than the threshold.

Further, in the present invention, the case where the at least one of the conditions is satisfied that the temperature of the selective reduction type NOx catalyst is equal to or lower than the threshold, that the temperature of the exhaust is equal to or lower than the threshold, that the flow rate of the exhaust is equal to or higher than the threshold, and that the adsorption amount of the reducing agent in the selective reduction type NOx catalyst is equal to or larger than the threshold o may be a case where any one value of or a product of two or more values of indices for indicating a degree of passing of the reducing agent through the selective reduction type NOx catalyst, the indices including an index which increases as the temperature of the selective reduction type NOx catalyst or the temperature of the exhaust decreases, an index which increases as the flow rate of the exhaust increases, and an index which increases as the adsorption amount of the reducing agent in the NOx catalyst increases is equal to or larger than a threshold.

The indices includes ones that indicates a degree of passing of the reducing agent through the selective reduction type NOx catalyst due to an influence of the temperature of the selective reduction type NOx catalyst, that indicates a degree of passing of the reducing agent through the selective reduction type NOx catalyst due to an influence of the temperature of the exhaust, that indicates a degree of passing of the reducing agent through the selective reduction type NOx catalyst due to an influence of the flow rate of the exhaust, and that indicates a degree of passing of the reducing agent through the selective reduction type NOx catalyst due to an influence of the adsorption amount of the reducing agent in the selective reduction type NOx catalyst. The degree of passing of the reducing agent through the selective reduction type NOx catalyst may be a ratio of the reducing agent that passes through the selective reduction type NOx catalyst with respect to the reducing agent that flows into the selective reduction type, for example. Further, the index may be a value that indicates the amount of the reducing agent that passes through the selective reduction type NOx catalyst. For example, the amount of the reducing agent that passes through the selective reduction type NOx catalyst increases as the index increases. Different physical quantities such as temperature, flow rate, and adsorption amount can be handled in the same way by using those indices. Accordingly, a determination can easily be made whether or not the process for removing the reducing agent that attaches to the PM sensor.

Further, in the present invention, an amount of the reducing agent that passes through the selective reduction type NOx catalyst may increase as the temperature of the selective reduction type NOx catalyst or the temperature of the exhaust decreases, increases as the flow rate of the exhaust increases, and increases as the adsorption amount of the reducing agent in the selective reduction type NOx catalyst increases, the removal section may calculate the amount of the reducing agent that passes through the selective reduction type NOx catalyst according to at least one of the temperature of the selective reduction type NOx catalyst or the temperature of the exhaust, the flow rate of the exhaust, and the adsorption amount of the reducing agent in the selective reduction type NOx catalyst, and the case where the at least one of the conditions is satisfied that the temperature of the selective reduction type NOx catalyst is equal to or lower than the threshold, that the temperature of the exhaust is equal to or lower than the threshold, that the flow rate of the exhaust is equal to or higher than the threshold, and that the adsorption amount of the reducing agent in the selective reduction type NOx catalyst is equal to or larger than the threshold may be a case where the amount of the reducing agent that passes through the selective reduction type NOx catalyst is equal to or larger than a threshold.

Here, the temperature of the selective reduction type NOx catalyst correlates with the amount of the reducing agent that passes through the selective reduction type NOx catalyst, and the amount of the reducing agent that passes through the selective reduction type NOx catalyst increases as the temperature of the selective reduction type NOx catalyst decreases. Further, the temperature of the exhaust correlates with the amount of the reducing agent that passes through the selective reduction type NOx catalyst, and the amount of the reducing agent that passes through the selective reduction type NOx catalyst increases as the temperature of the exhaust decreases. Further, the flow rate of the exhaust correlates with the amount of the reducing agent that passes through the selective reduction type NOx catalyst, and the amount of the reducing agent that passes through the selective reduction type NOx catalyst increases as the flow rate of the exhaust increases. Further, the adsorption amount of the reducing agent in the selective reduction type NOx catalyst correlates with the amount of the reducing agent that passes through the selective reduction type NOx catalyst, and the amount of the reducing agent that passes through the selective reduction type NOx catalyst increases as the adsorption amount increases.

On the basis of those relationships, the amount of the reducing agent that passes through the selective reduction type NOx catalyst can be obtained. The amount of the reducing agent that attaches to the PM sensor increases as the amount of the reducing agent that passes through the selective reduction type NOx catalyst increases. The amount of the reducing agent that passes through the selective reduction type NOx catalyst may be a cumulative value of the amount of the reducing agent that passes through the selective reduction type NOx catalyst in a prescribed period and may be the amount of the reducing agent that passes through the selective reduction type NOx catalyst per unit time.

The threshold of the amount of the reducing agent that passes through the selective reduction type NOx catalyst may be the reducing agent amount that passes through the NOx catalyst and the reducing agent amount in a case where the influence on the detection value of the PM sensor exceeds an allowable range. Further, the threshold may be the reducing agent amount that passes through the selective reduction type NOx catalyst and a lower limit value of the reducing agent amount in which the detection value of the PM sensor changes. In other words, when the amount of the reducing agent that passes through the selective reduction type NOx catalyst becomes equal to or larger than the threshold, the accuracy in the determination on the filter trouble decreases due to an influence of the reducing agent that attaches to the PM sensor. On the other hand, if the process for removing the reducing agent that attaches to the PM sensor is conducted when the amount of the reducing agent that passes through the selective reduction type NOx catalyst is equal to or larger than the threshold, the reducing agent hardly influences the detection value of the PM sensor, and the decrease in the accuracy in the determination on the filter trouble can thus be restricted.

Further, in the present invention, the removal section may conduct the process for removing the reducing agent that attaches to the PM sensor in the case where the at least one of the conditions is satisfied that the temperature of the selective reduction type NOx catalyst is equal to or lower than the threshold, that the temperature of the exhaust is equal to or lower than the threshold, that the flow rate of the exhaust is equal to or higher than the threshold, and that the adsorption amount of the reducing agent in the selective reduction type NOx catalyst is equal to or larger than the threshold, and in a case where a detection value of the PM sensor decreases.

Here, the detection value is constant if the reducing agent and the PM do not attach to the PM sensor. Further, the detection value of the PM sensor increases when only the PM attaches to the PM sensor. On the other hand, the detection value of the PM sensor increases when the reducing agent attaches to the PM sensor, but the detection value decreases when the reducing agent vaporizes. In a case where only the PM attaches to the PM sensor, the detection value does not decrease unless the process for removing the PM is conducted. In other words, the reducing agent may attach to the PM sensor in a case where the detection value of the PM sensor decreases. Accordingly, when a determination is made whether or not the process for removing the reducing agent that attaches to the PM sensor is conducted, a more appropriate determination can be made by making the determination in consideration of the decrease in the detection value of the PM sensor.

Further, in the present invention, the removal section may conduct the process for removing the reducing agent that attaches to the PM sensor in the case where the at least one of the conditions is satisfied that the temperature of the selective reduction type NOx catalyst is equal to or lower than the threshold, that the temperature of the exhaust is equal to or lower than the threshold, that the flow rate of the exhaust is equal to or higher than the threshold, and that the adsorption amount of the reducing agent in the selective reduction type NOx catalyst is equal to or larger than the threshold, and in a case where a time in which a detection value of the PM sensor becomes equal to or larger than a specified value after the process for removing the particulate matters that attach to the PM sensor is conducted is equal to or shorter than a threshold.

The amount of the PM can be detected when the PM attaches to the PM sensor. However, because the detection accuracy may decrease when an attached amount of the PM increases, the process for removing the PM from the PM sensor may be conducted. The process is conducted, and the PM and the reducing agent that attach to the PM sensor are thereby removed. As described above, when the PM or the reducing agent attaches to the PM sensor from a state where the PM and the reducing agent do not attach to the PM sensor, the detection value of the PM sensor increases.

Here, there is a limit for the increase in the detection value of the PM sensor because the amount of the PM that is discharged from the internal combustion engine is limited. It can be considered that the reducing agent instead of the PM attaches to the PM sensor in a case where the detection value of the PM sensor increases while exceeding the limit. In a case where the time in which the detection value of the PM sensor becomes equal to or larger than the specified value after the process for removing the PM that attaches to the PM sensor, it can be considered that the reducing agent attaches to the PM sensor.

The threshold described herein may be a longer time than the time required for the increase in the detection value of the PM sensor to the specified value, on the assumption that the filter is not provided in an operational state where the largest amount of the PM is discharged from the internal combustion engine. In other words, the largest amount of the PM attaches to the PM sensor in a case where the filter is not provided in an operational state where the largest amount of the PM is discharged from the internal combustion engine. If a degree of actual increase in the detection value is higher than a degree of increase in the detection value of the PM sensor in such a case, it can be considered that the reducing agent attaches to the PM sensor. The threshold changes according to the specified value of the detection value of the PM sensor. Further, the threshold may be a time required for an increase in the detection value of the PM sensor to the specified value when the amount of the reducing agent that attaches to the PM sensor exceeds the allowable range.

As described above, if a determination is made whether or not the process for removing the reducing agent that attaches to the PM sensor is conducted in consideration of the time in which the detection value of the PM sensor becomes equal to or larger than the specified value after the process for removing the particulate matters that attach to the PM sensor, a more appropriate determination can be made. Further, because it is assumed that the filter is not provided, an appropriate determination can be made even if the filter has trouble and the degree of increase in the detection value of the PM sensor is high.

In the present invention, the removal section may increase a temperature of the PM sensor to 360° C. or higher to conduct the process for removing the reducing agent that attaches to the PM sensor.

The reducing agent vaporizes at a relatively lower temperature than the PM. Thus, even if the reducing agent attaches to the PM sensor, the PM can accurately be detected after the reducing agent is removed by vaporization. Here, in a case where the aqueous urea solution is supplied as the reducing agent from the supply device, biuret or cyanuric acid are produced as the intermediate products in the reaction to finally produced $NH_3$. Biuret vaporizes at 190° C. or higher, and cyanuric acid vaporizes at 360° C. or higher. Accordingly, the temperature of the PM sensor can be increased to 360° C. or higher to vaporize the intermediate products. The reducing agent that attaches to the PM sensor can thereby be removed, and a change in the detection value of the PM sensor can be restricted. When the temperature of the PM sensor can be increased to 360° C. or higher and lower than a temperature at which the PM is oxidized. In other words, the reducing agent is removed from the PM sensor, but the PM is not required to be removed.

In the present invention, when the temperature of the PM sensor is increased to 360° C. or higher, the removal section may increase the temperature of the PM sensor in a case the detection value of the PM sensor decreases to a temperature higher than in a case where the detection value of the PM sensor does not decrease.

Here, it can be considered that the reducing agent attaches to the PM sensor in a case where the detection value of the PM sensor decreases when the temperature of the PM sensor is increased to 360° C. or higher. In other words, it is considered that the reducing agent vaporizes and the detection value of the PM sensor decreases due to the increase of the temperature of the PM sensor to 360° C. or higher. In such a case, the temperature of the PM sensor is further increased, and the removal of the reducing agent can quickly be completed. This enables an early determination on the filter trouble.

Effect of the Invention

According to the present invention, the decrease in the determination on the filter trouble due to the decrease in the detection accuracy of the PM sensor can be restricted.

BRIEF DESCRIPTION OF THE DRAWINGS

FIG. 10 is a table that shows the relationship among a reducing agent amount, a temperature of the NOx catalyst 7, and production amounts of intermediate products.

FIG. 11 is a table that shows the relationship among an intake air amount Ga, an $NH_3$ adsorption rate, and a ratio of the intermediate products that pass through the NOx catalyst with respect to the intermediate products that flow into the NOx catalyst.

FIG. 13 is a time chart that represents variations of the detection values of the PM sensor in cases where the detection value of the PM sensor is normal and where the detection value of the PM sensor is abnormal.

MODES FOR CARRYING OUT THE INVENTION

Specific embodiments of an exhaust purification device for an internal combustion engine in accordance with the present invention will be described hereinafter with reference to drawings.

First Embodiment

Figure 1:
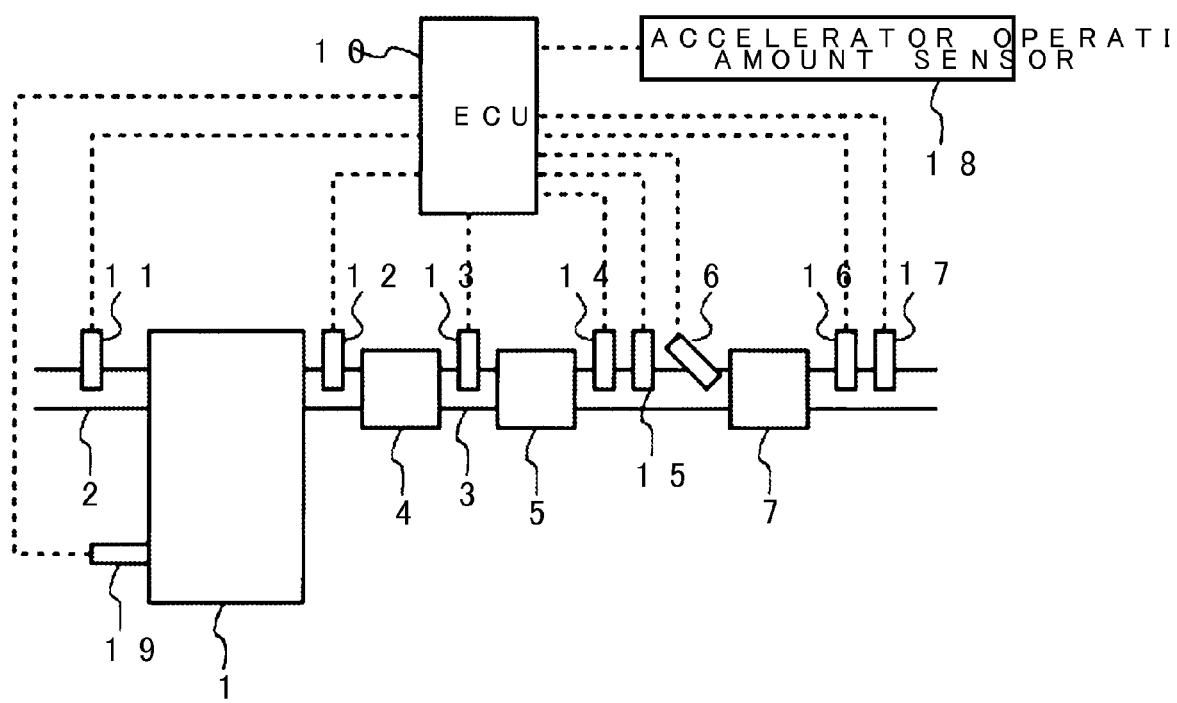
FIG. 1 illustrates a schematic configuration of an exhaust purification device for an internal combustion engine in accordance with an embodiment.

FIG. 1 illustrates a schematic configuration of the exhaust purification device for an internal combustion engine in accordance with this embodiment. An internal combustion engine 1 shown in FIG. 1 is a diesel engine but may be a gasoline engine.

An intake passage 2 and an exhaust passage 3 are connected to the internal combustion engine 1. An air flow meter 11 that detects an amount of intake air flowing through the intake passage 2 is provided in the intake passage 2. Meanwhile, an oxidation catalyst 4, a filter 5, an injection valve 6, and a selective reduction type NOx catalyst 7 (referred to as NOx catalyst 7 hereinafter) are provided from an upstream side in a direction of exhaust flow.

The oxidation catalyst 4 may be a catalyst that has oxidation ability, for example, a three-way catalyst. The oxidation catalyst 4 may be carried on the filter 5.

The filter 5 collects PM in the exhaust. A catalyst may be carried on the filter 5. The filter 5 collects the PM, and the PM gradually accumulates in the filter 5. Further, a so-called filter regeneration process that forcibly increases a temperature of the filter 5 is conducted, and the PM accumulated in the filter 5 can thereby be oxidized and removed. For example, the temperature of the filter 5 can be increased by supplying HC to the oxidation catalyst 4. Alternatively, instead of including the oxidation catalyst 4, another device that increases the temperature of the filter 5 may be included. In addition, a gas at a high temperature may be discharged from the internal combustion engine 1 to increase the temperature of the filter 5.

The injection valve 6 injects a reducing agent. For example, an agent such as an aqueous urea solution that is derived from ammonia is used as the reducing agent. For example, the aqueous urea solution injected from the injection valve 6 becomes ammonia ($NH_3$) by hydrolysis by heat of the exhaust, and a portion or the whole ammonia is adsorbed on the NOx catalyst 7. In a description below, the injection valve 6 injects the aqueous urea solution as the reducing agent. The injection valve 6 in this embodiment corresponds to a supply device in the present invention.

The NOx catalyst 7 reduces NOx in the exhaust when the reducing agent is present. For example, if the ammonia ($NH_3$) is in advance adsorbed on the NOx catalyst 7, NOx can be reduced by ammonia when NOx passes through the NOx catalyst 7.

A first exhaust temperature sensor 12 that detects a temperature of the exhaust is provided in the exhaust passage 3 that is in the upstream portion of the oxidation catalyst 4. A second exhaust temperature sensor 13 that detects the temperature of the exhaust is provided in the exhaust passage 3 that is in the downstream portion of the oxidation catalyst 4 and in the upstream portion of the filter 5. A third exhaust temperature sensor 14 that detects the temperature of the exhaust and a first NOx sensor 15 that detects a NOx concentration in the exhaust are provided in the exhaust passage 3 that is in the downstream side portion of the filter 5 and in the upstream portion of the injection valve 6. A second NOx sensor 16 that detects the NOx concentration in the exhaust and a PM sensor 17 that detects a PM amount in the exhaust are provided in the exhaust passage 3 that is in the downstream portion of the NOx catalyst 7. All those sensors are not necessarily required but may be provided according to necessity.

An ECU 10 that is an electronic control unit is provided along with the internal combustion engine 1 configured as described above. The ECU 10 controls the internal combustion engine 1 according to an operational condition of the internal combustion engine 1 and a request of a driver.

An accelerator operation amount sensor 18 that outputs an electric signal according to a pedaling effort on an accelerator pedal and can detect an engine load and a crank position sensor 19 that detects an engine speed other than the above sensors are connected to the ECU 10 via electrical wires, and output signals of the sensors are input to the ECU 10. Meanwhile, the injection valve 6 is connected to the ECU 10 via an electric wire, and the ECU 10 controls the injection valve 6.

The ECU 10 conducts the filter regeneration process when the PM amount accumulated in the filter 5 becomes equal to or larger than a prescribed amount. The filter regeneration process may be performed when a travel distance of a vehicle in which the internal combustion engine 1 is installed becomes a prescribed distance or longer. Further, the filter regeneration process may be conducted for regular periods.

Further, the ECU 10 makes a determination on trouble of the filter 5 on the basis of the PM amount detected by the PM sensor 17. Here, when trouble such as a crack of the filter 5 occurs, the PM amount that passes through the filter 5 increases. When the increase in the PM amount is detected by the PM sensor 17, the determination can be made on the trouble of the filter 5.

For example, the determination on the trouble of the filter 5 is made by comparing a cumulative value of the PM amount for a prescribed period that is calculated on the basis of the detection values of the PM sensor 17 with a cumulative value of the PM amount for a prescribed value on an assumption that the filter 5 is in a prescribed state. The determination on the trouble of the filter 5 may be made on the basis of an increase amount in the PM amount detected by the PM sensor 17 for the prescribed period. For example, a determination that the filter 5 has trouble may be made when the increase amount in the PM amount detected by the PM sensor 17 for the prescribed period is equal to or larger than a threshold.

Figure 2:
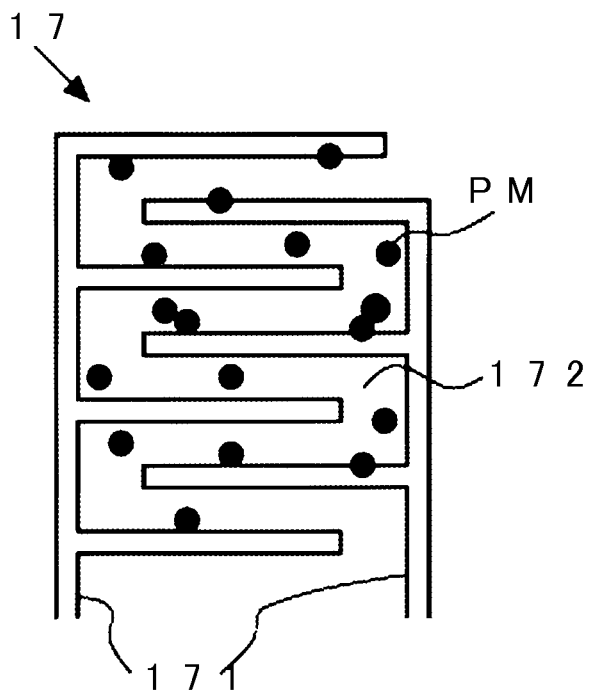
FIG. 2 is a schematic configuration view of a PM sensor.

FIG. 2 is a schematic configuration view of the PM sensor 17. The PM sensor 17 is a sensor that outputs an electric signal corresponding to the PM amount accumulated in itself. The PM sensor 17 is configured to include a pair of electrodes 171 and an insulator 172 provided between the pair of electrodes 171. When the PM attaches to a section between the pair of electrodes 171, electric resistance between the pair of electrodes 171 changes. Because the change in the electric resistance correlates with the PM amount in the exhaust, the PM amount in the exhaust can be detected on the basis of the change in the electric resistance. The PM amount may be set as a mass of the PM per unit time or as the mass of the PM for a prescribed time. The configuration of the PM sensor 17 is not limited to one in FIG. 2. In other words, it is sufficient that the PM sensor has a configuration that detects the PM and allows a change in the detection value by an influence of the reducing agent.

Figure 3:
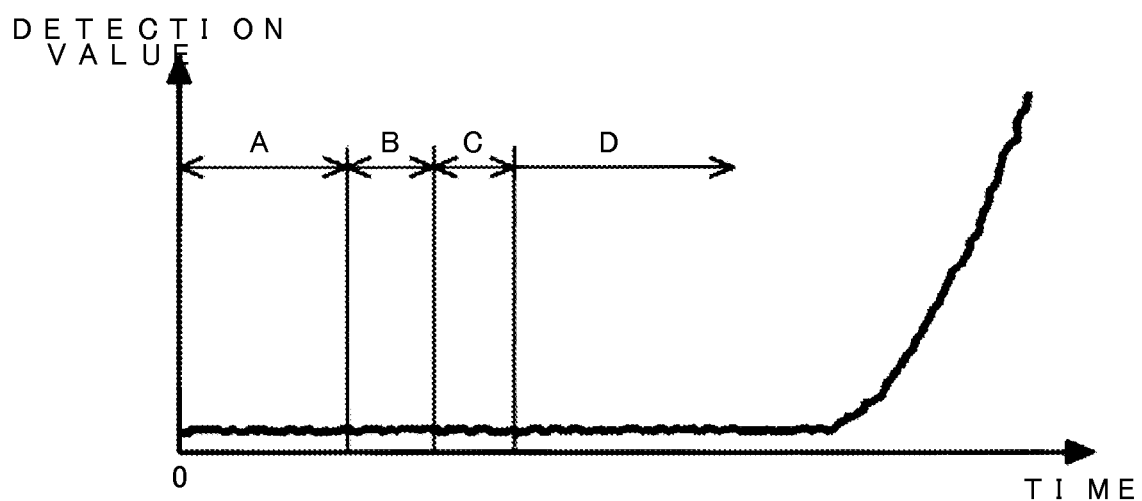
FIG. 3 is a time chart that represents a variation of a detection value of the PM sensor.

Next, FIG. 3 is a time chart that represents a variation of the detection value of the PM sensor 17. A period denoted by A immediately after a start of the internal combustion engine 1 is a period in which water that condenses in the exhaust passage 3 may attach to the PM sensor 17. When water attaches to the PM sensor 17, because the detection value of the PM sensor 17 changes or the PM sensor 17 has trouble, the detection of the PM amount by the PM sensor 17 is not performed in the period.

In a period denoted by B after the period denoted by A, a process for removing the PM that attaches to the PM sensor 17 in a previous operation of the internal combustion engine 1 (referred to as PM removal process hereinafter) is performed. The PM removal process is performed by increasing a temperature of the PM sensor 17 to a temperature at which the PM oxidizes. The detection of the PM by the PM sensor 17 is not performed either in the period denoted by B.

A period denoted by C after the period denoted by B is a period that is required for obtaining an appropriate temperature for the detection of PM. In other words, the temperature of the PM sensor 17 becomes higher than the appropriate temperature for the detection of the PM in the period denoted by B, the detection is delayed until the temperature decreases to the appropriate temperature for the detection of the PM. The detection of the PM by the PM sensor 17 is not performed either in the period denoted by C.

The detection of the PM is then performed in a period denoted by D after the period denoted by C. Even in the period denoted by D, the detection value does not increase until a certain amount of the PM accumulates in the PM sensor 17. In other words, the detection value starts increasing after the certain amount of the PM accumulates and current starts flowing between the pair of electrodes 171. The detection value thereafter increases according to the PM amount in the exhaust.

Here, the PM sensor 17 is provided on the downstream of the filter 5. Thus, the PM that is not collected by the filter 5 and passes through the filter 5 attaches to the PM sensor 17. Accordingly, a PM accumulation amount in the PM sensor 17 corresponds to the cumulative value of the PM amount that passes through the filter 5.

Figure 4:
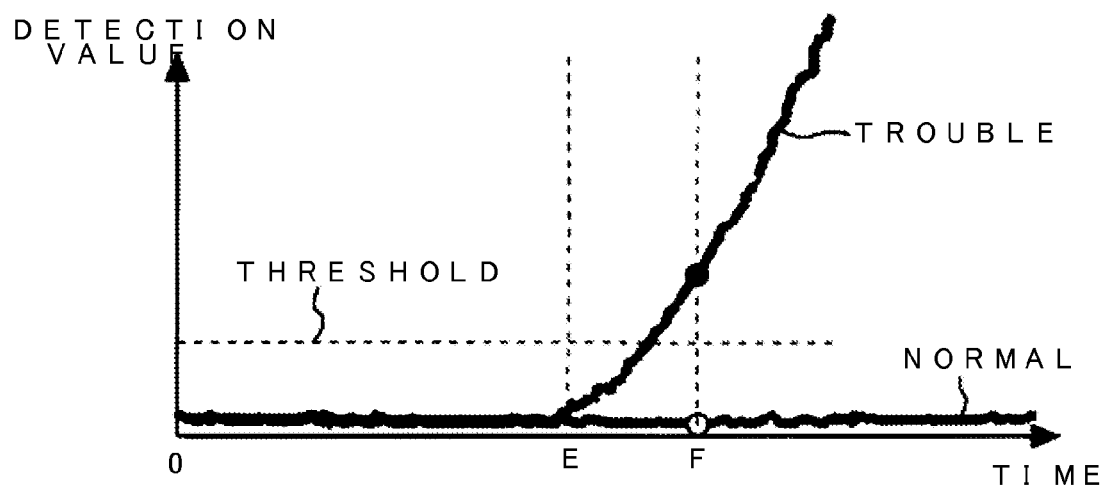
FIG. 4 is a time chart that represents variations of the detection values of the PM sensor in cases where the filter is normal and where the filter has trouble.

Here, FIG. 4 is a time chart that represents variations of the detection values of the PM sensor 17 in cases where the filter 5 is normal and where the filter 5 has trouble. In the case where the filter 5 has trouble, the PM rapidly accumulates in the PM sensor 17, a time point E at which the detection value starts increasing is early compared to the normal filter 5. Thus, for example, if the detection value after a prescribed time F has elapsed after the start of the internal combustion engine 1 is equal to or larger than a threshold, the determination is made that the filter 5 has trouble. During the prescribed time F, the detection value of the PM sensor 17 does not increase with the normal filter 5, but the detection value of the PM sensor 17 increases with the filter 5 having trouble. The prescribed period F can be obtained by experiment or the like. Further, the threshold is in advance obtained by experiment or the like as a lower limit value of the detection value of the PM sensor 17 in the case where the filter 5 has trouble.

Incidentally, it can be considered that the PM sensor 17 is provided in the downstream portion of the filter 5 and in the upstream portion of the NOx catalyst 7. However, if the PM sensor 17 is provided in such a position, a distance from the filter 5 to the PM sensor 17 becomes short. Thus, the PM that passes through a cracked portion in the filter 5 may reach a periphery of the PM sensor 17 without dispersing in the exhaust. Then, depending on a position of the crack in the filter 5, the PM hardly attaches to the PM sensor 17 and is thus not detected, and accuracy of the determination on trouble may decrease.

However, in this embodiment, the PM sensor 17 is provided in the downstream portion of the NOx catalyst 7, and the distance from the filter 5 to the PM sensor 17 is thus long. Accordingly, the PM that passes through the filter 5 disposes in the exhaust in the periphery of the PM sensor 17. Therefore, the PM can be detected regardless of the position of the crack in the filter 5. However, because the PM sensor 17 is provided on the downstream of the injection valve 6, the reducing agent injected from the injection valve 6 may attach to the PM sensor 17. The reducing agent that attaches to the PM sensor 17 includes urea and intermediate products (biuret, cyanuric acid) in a reaction from urea to ammonia. When the reducing agent attaches to the PM sensor 17, the detection value of the PM sensor 17 may change.

Figure 5:
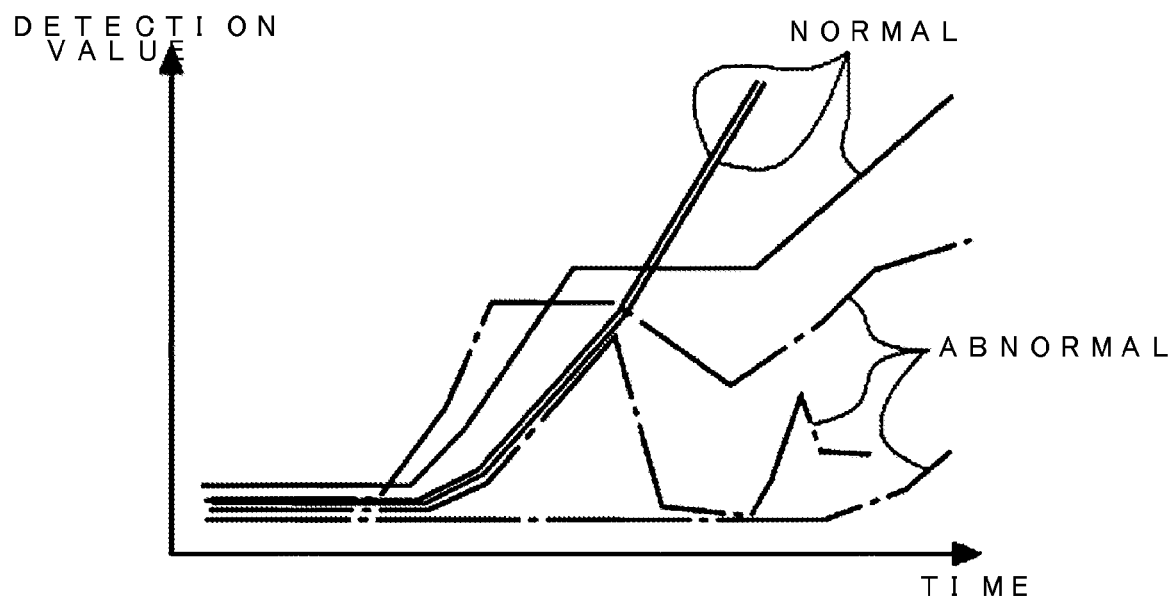
FIG. 5 is a time chart that represents variations in cases where the detection value of the PM sensor is normal and where the detection value of the PM sensor is abnormal.

Here, FIG. 5 is a time chart that represents variations in cases where the detection value of the PM sensor 17 is normal and where the detection value of the PM sensor 17 is abnormal. The abnormal value can be the detection value in a case where the reducing agent attaches to the PM sensor 17.

When the detection value is normal, the detection value increases along with a lapse of time, or the detection value does not change. In other words, the detection value increases according to the PM amount attached to the PM sensor 17. On the other hand, when the detection value is abnormal, the detection value may not only increases but also decreases. Here, when the intermediate products attach to and accumulate in the PM sensor 17 to a prescribed amount or more, the detection value of the PM sensor 17 increases in the same way as when the PM accumulates. Here, biuret as the intermediate product is produced at temperatures from 132° C. to 190° C. and vaporizes at a temperature higher than that. Further, cyanuric acid as the intermediate product is produced at temperatures from 190° C. to 360° C. and vaporizes at a temperature higher than that. As described above, the intermediate products vaporize at lower temperatures compared to the PM. Accordingly, the intermediate products attached to the PM sensor 17 vaporize when the temperature of the exhaust of the internal combustion engine 1 is high. In such a case, because an accumulation amount of the intermediate products decreases, the detection value of the PM sensor 17 decreases. This phenomenon does not occur when only the PM accumulates in the PM sensor 17.

Further, when the intermediate products attach to and accumulate on a cover of the PM sensor 17, the intermediate products may block the cover. When the cover is blocked by the intermediate products, the PM cannot reach the pair of electrodes 171, resulting in difficulty in the detection of the PM. Consequently, a time when the detection value of the PM sensor 17 starts increasing is delayed compared to a normal case. This may decrease the accuracy of the determination on trouble of the filter 5.

As described above, when the reducing agent passes through the NOx catalyst 7, the determination on trouble of the filter 5 may become difficult. Taking into account that the aqueous urea solution undergoes thermal decomposition and hydrolysis to produce $NH_3$ in general, the following three conditions are considered as causes of passing of the reducing agent through the NOx catalyst 7.

(1) The temperature of the NOx catalyst 7 or the temperature of the exhaust is low. That is to say, if the temperature of the NOx catalyst 7 or the exhaust is low, the thermal decomposition of the reducing agent takes time, and the reducing agent thus passes through the NOx catalyst 7 before a reaction of the reducing agent is complete.

(2) A flow rate of the exhaust that passes through the NOx catalyst 7 is high. It may also be considered that a flow speed of the exhaust that passes through the NOx catalyst 7 is fast. It may further be considered that an intake air amount of the internal combustion engine 1 is large. That is to say, if the flow rate of the exhaust is high, a time in which the reducing agent contacts the NOx catalyst 7 becomes short, and the reducing agent thus passes through the NOx catalyst 7 before the reaction of the reducing agent is complete.

(3) An $NH_3$ amount that is adsorbed on the NOx catalyst 7 is large. It may also be considered that an $NH_3$ adsorption rate is high. The $NH_3$ adsorption rate is a rate of the $NH_3$ amount that is adsorbed on the NOx catalyst 7 with respect to a maximum adsorbable $NH_3$ amount on the NOx catalyst 7. That is to say, because it becomes more difficult for the hydrolysis to proceed as the $NH_3$ amount that is adsorbed on the NOx catalyst 7 becomes larger, the thermal decomposition of the reducing agent takes time, and the reducing agent thus passes through the NOx catalyst 7 before the reaction of the reducing agent is complete.

The above (1), (2) are phenomena that are caused due to an insufficient reaction time, (3) is a phenomenon that is caused due to the large adsorption amount of $NH_3$.

In this embodiment, a reducing agent amount is calculated on the basis of at least one of the flow rate or the flow speed of the exhaust that passes through the NOx catalyst 7, the temperature of the NOx catalyst 7 or the temperature of the exhaust, and the adsorption rate of $NH_3$ or the adsorption amount of $NH_3$ on the NOx catalyst 7, for example. The reducing agent amount that reaches the PM sensor 17 may be the reducing agent amount that passes through the filter 5 or may be the reducing agent amount that attaches to the PM sensor 17.

In a case where the reducing agent amount that reaches the PM sensor 17 is equal to or larger than threshold, a process for removing the reducing agent that attaches to the PM sensor 17 (also referred to as reducing agent removal process hereinafter) is conducted. The threshold can be obtained in advance by experiment or the like as a value in a case where an influence on the detection value of the PM sensor 17 exceeds an allowable range. The reducing agent amount that reaches the PM sensor 17 may be the reducing agent amount per unit time or a cumulative value.

The reducing agent removal process is conducted by increasing the temperature of the PM sensor 17 to the temperature at which the reducing agent vaporizes. Here, biuret that is the intermediate product vaporizes at 190° C. or higher, and cyanuric acid vaporizes at 360° C. or higher. Accordingly, in this embodiment, the temperature of the PM sensor 17 is increased to 360° C. or higher to vaporize the intermediate products. In this case, the temperature is lower than a temperature at which the PM is oxidized. The ECU 10 that conducts the process for removing the reducing agent that attaches to the PM sensor 17 corresponds to a removal section in the present invention.

Figure 6:
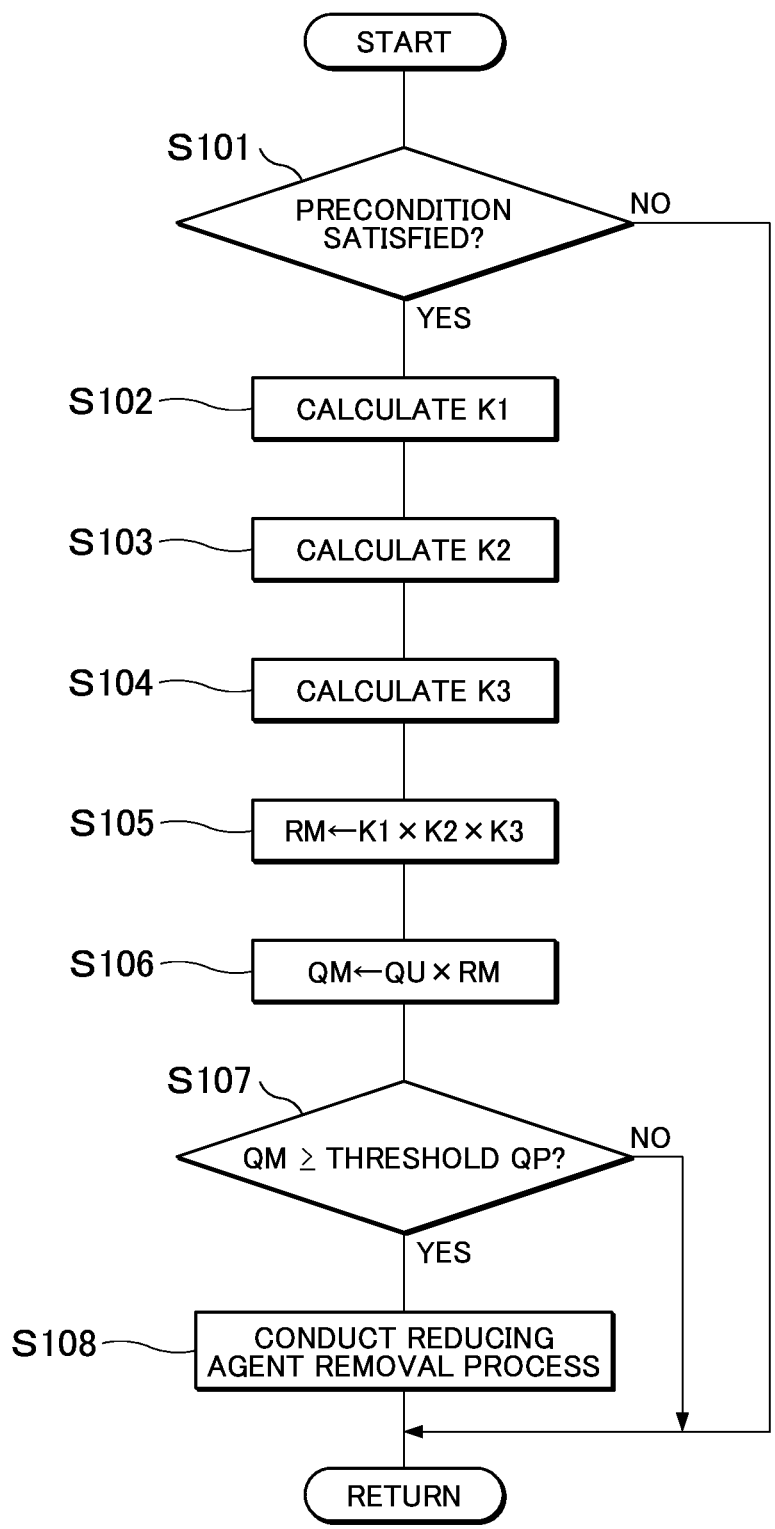
FIG. 6 is a flowchart that illustrates a flow of a reducing agent removal process in accordance with a first embodiment.

FIG. 6 is a flowchart that illustrates a flow of the reducing agent removal process in accordance with this embodiment. This routine is executed by the ECU 10 in each prescribed time.

A determination is made in step S101 whether or not a precondition for supply of the reducing agent is satisfied. A determination is made in this step whether or not a state where the reducing agent can be supplied is obtained. Further, a determination may be made whether or not the reducing agent has been supplied.

The determination that the precondition for the supply of the reducing agent is satisfied is made when the various kinds of sensors are normal. A determination can be made whether or not the various kinds of sensors are normal by known techniques. Further, the determination that the precondition for the supply of the reducing agent is satisfied is made when an operational state of the internal combustion engine 1 is an appropriate operational state for the supply of the reducing agent. If an affirmative determination is made in step S101, the process moves to step S102. If a negative determination is made, this routine is finished.

In step S102, a first coefficient K1 is calculated on the basis of the flow rate of the exhaust that passes through the NOx catalyst 7. The first coefficient K1 is a value that represents a ratio of the reducing agent amount that passes through the NOx catalyst 7 due to the high flow rate of the exhaust with respect to the reducing agent amount that flows into the NOx catalyst 7. The first coefficient K1 may be calculated on the basis of the flow speed of the exhaust that passes through the NOx catalyst 7 instead of the flow rate of the exhaust that passes through the NOx catalyst 7. Further, the flow rate of the exhaust or the flow speed of the exhaust that passes through the exhaust passage 3 may be used instead of the flow rate of the exhaust that passes through the NOx catalyst 7. The flow rate or the flow speed of the exhaust can be calculated on the basis of the intake air amount that is detected by the air flow meter 11.

Figure 7:
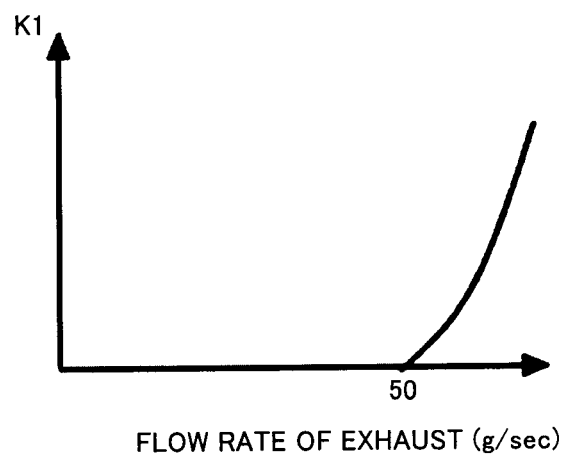
FIG. 7 is a graph that represents the relationship between a flow rate of exhaust that passes through a NOx catalyst and a first coefficient K1.

Here, FIG. 7 is a graph that represents the relationship between the flow rate of the exhaust that passes through the NOx catalyst 7 and the first coefficient K1. The same relationship can be obtained by using the flow speed of the exhaust instead of the flow rate of the exhaust. Here, a condition is set that the reducing agent does not pass through the NOx catalyst 7 until the flow rate becomes 50 g/s, for example, and the first coefficient K1 is set as a constant value for this period. Then, when the flow rate of the exhaust becomes equal to or higher than 50 g/s, for example, the first coefficient K1 increases as the flow rate of the exhaust increases. In other words, the reducing agent more easily passes through the NOx catalyst 7 as the flow rate of the exhaust increases. Consequently, because the reducing agent amount that passes through the NOx catalyst 7 increases as the flow rate of the exhaust increases, the first coefficient K1 increases. This relationship is in advance obtained by experiment or the like and stored in the ECU 10.

In step S103, a second coefficient K2 is calculated on the basis of the temperature the NOx catalyst 7. The second coefficient K2 is a value that represents a ratio of the reducing agent amount that passes through the NOx catalyst 7 due to the low temperature of the NOx catalyst 7 with respect to the reducing agent amount that flows into the NOx catalyst 7. The second coefficient K2 may be calculated on the basis of the temperature of the exhaust instead of the temperature of the NOx catalyst 7. The temperature of the exhaust may be the temperature of the exhaust on the downstream of the NOx catalyst 7 or the temperature of the exhaust that passes through the NOx catalyst 7. Further, the temperature of the NOx catalyst 7 may be a temperature that is detected by the third exhaust temperature sensor 14. Moreover, the temperature of the NOx catalyst 7 may be directly detected by installing a sensor that detects the temperature of the NOx catalyst 7.

Figure 8:
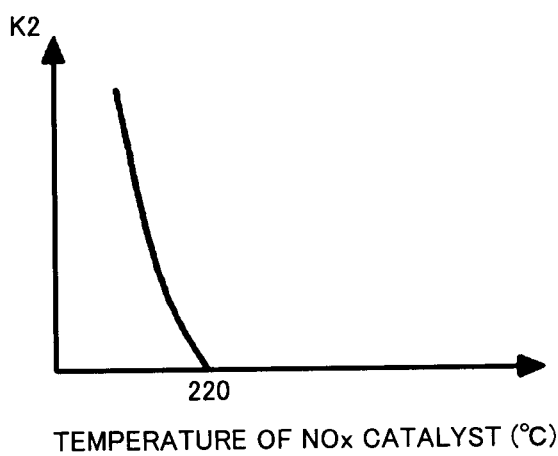
FIG. 8 is a graph that represents the relationship between a temperature of the NOx catalyst and a second coefficient K2.

Here, FIG. 8 is a graph that represents the relationship between the temperature of the NOx catalyst 7 and the second coefficient K2. The same relationship can be obtained by using the temperature of the exhaust instead of the temperature of the NOx catalyst 7. When the temperature of the NOx catalyst 7 becomes equal to or higher than 220° C., for example, the sufficiently high temperature of the NOx catalyst 7 facilitates the reaction of the reducing agent. Accordingly, a condition is set that the reducing agent does not pass through the NOx catalyst 7 at a temperature of 220° C. or higher, and the second coefficient K2 is set as a constant value for this period. When the temperature of the NOx catalyst 7 becomes lower than 220° C., the second coefficient K2 increases as the temperature of the NOx catalyst 7 decreases. In other words, the reducing agent more easily passes through the NOx catalyst 7 as the temperature of the NOx catalyst 7 decreases. Consequently, because the reducing agent amount that passes through the NOx catalyst 7 increases as the temperature of the NOx catalyst 7 decreases, the second coefficient K2 increases. This relationship is in advance obtained by experiment or the like and stored in the ECU 10.

In step S104, a third coefficient K3 is calculated on the basis of the adsorption rate of $NH_3$ in the NOx catalyst 7. The third coefficient K3 is a value that represents a ratio of the reducing agent amount that passes through the NOx catalyst 7 due to the high adsorption rate of $NH_3$ in the NOx catalyst 7 with respect to the reducing agent amount that flows into the NOx catalyst 7. The adsorption rate of $NH_3$ in the NOx catalyst 7 is a value obtained by dividing the $NH_3$ amount that is adsorbed in the NOx catalyst 7 by the maximum adsorbable $NH_3$ amount in the NOx catalyst 7. The $NH_3$ amount that is adsorbed in the NOx catalyst 7 can be obtained on the basis of a supply amount of the reducing agent, the temperature of the NOx catalyst 7, the flow rate of the exhaust, or the like, for example. Further, the maximum adsorbable $NH_3$ amount in the NOx catalyst 7 changes according to the temperature of the NOx catalyst 7 and a degree of degradation of the NOx catalyst 7. Those relationships can be obtained in advance by experiment or the like. The adsorption rate of the $NH_3$ in the NOx catalyst 7 can also be obtained by known technique.

Figure 9:
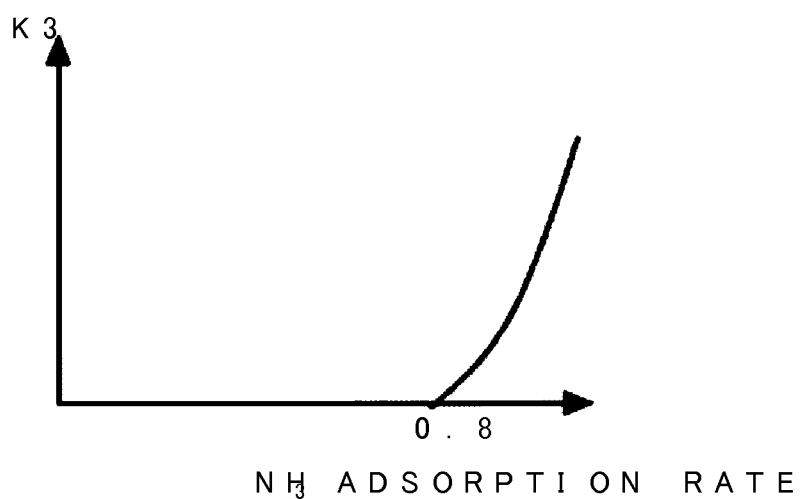
FIG. 9 is a graph that represents the relationship between an adsorption rate of $NH_3$ in the NOx catalyst and a third coefficient K3.

Here, FIG. 9 is a graph that represents the relationship between the adsorption rate of $NH_3$ in the NOx catalyst 7 and the third coefficient K3. The same relationship can be obtained by using the adsorption amount of the $NH_3$ instead of the adsorption rate of $NH_3$. A condition is set that the reducing agent does not pass the NOx catalyst 7 until the adsorption rate of $NH_3$ in the NOx catalyst 7 becomes 0.8, for example, and the third coefficient K3 is set as a constant value for this period. Then, when the adsorption rate of $NH_3$ in the NOx catalyst 7 becomes equal to or higher than 0.8, for example, the third coefficient K3 increases in response to an increase in the adsorption rate. In other words, the reducing agent more easily passes through the NOx catalyst 7 as the adsorption rate increases. Consequently, because the reducing agent amount that passes through the NOx catalyst 7 increases as the adsorption rate increases, the third coefficient K3 increases. This relationship is in advance obtained by experiment or the like and stored in the ECU 10. Further, the relationship between the adsorption amount of $NH_3$ in the NOx catalyst 7 and the third coefficient K3 may be obtained by experiment or the like and stored in the ECU 10.

In step S105, a passing-through coefficient RM is calculated. The passing-through coefficient RM is a value obtained by multiplying the first coefficient K1 by the second coefficient K2 and the third coefficient K3. In other words, the passing-through coefficient RM is a value that represents a ratio of the reducing agent amount that passes through the NOx catalyst 7 with respect to the reducing agent amount that flows into the NOx catalyst 7.

In step S106, an estimation production amount QM is calculated by multiplying a supply amount QU of the reducing agent by the passing-through coefficient RM that is calculated in step S105. The estimation production amount QM is an estimation value of the reducing agent amount that passes through the NOx catalyst 7. A command value that is calculated by the ECU 10 can be used for the supply amount QU of the reducing agent. The supply amount QU of the reducing agent is set to a value corresponding to a NOx amount in the exhaust, for example. The NOx amount in the exhaust can be estimated on the basis of the operational state of the internal combustion engine 1.

A determination is made in step S107 whether or not the estimation production amount QM is equal to or larger than a threshold QP. The threshold QP is the reducing agent amount that passes through the NOx catalyst 7 and the reducing agent amount in a case where the influence on the detection value of the PM sensor 17 exceeds the allowable range. In other words, when the estimation production amount QM becomes equal to or larger than the threshold QP, the accuracy of the determination on trouble of the filter 5 decreases due to the influence of the reducing agent that attaches to the PM sensor 17.

If an affirmative determination is made in step S107, the process moves to step S108. If a negative determination is made, this routine is finished.

The reducing agent removal process is conducted in step S108. That is to say, because the detection value of the PM sensor 17 may change due to the reducing agent that attaches to the PM sensor 17, the process for removing the reducing agent from the PM sensor 17 is conducted. The reducing agent removal process is conducted by increasing the temperature of the PM sensor 17. For example, the temperature of the PM sensor 17 is increased by increasing the temperature of the exhaust. For example, the temperature of the exhaust can be increased by supplying HC to the oxidation catalyst 4. Further, a gas at a high temperature may be discharged from the internal combustion engine 1 to increase the temperature of the filter 5. Further, the temperature of the exhaust may be increased by a heater or the like.

In the flow shown in FIG. 6, all the first coefficient K1, second coefficient K2, and third coefficient K3 are used to calculate the passing-through coefficient RM; however, a value of any one of those may be used as passing-through coefficient RM. Further, the passing-through coefficient RM may be obtained by multiplying values of any two of those.

Moreover, the reducing agent removal process may be conducted when the passing-through coefficient RM is equal to or larger than the threshold.

Further, the determination is made whether or not the reducing agent removal process is conducted according to the passing-through coefficient in this embodiment. However, the determination can be made without using the passing-through coefficient RM, the first coefficient K2, the second coefficient K2, or the third coefficient K3. In other words, the reducing agent removal process may be conducted when the amount of the reducing agent that passes through the NOx catalyst 7 is equal to or larger than the threshold. In such a case, above step S102 to step S106 are not required. A determination is made in step S107 whether or not the amount of the reducing agent that passes through the NOx catalyst 7 is equal to or larger than the threshold.

Further, the reducing agent removal process may be conducted when an amount of the intermediate products that attach to the PM sensor 17 is equal to or larger than the threshold. Here, FIG. 10 is a table that shows the relationship among the reducing agent amount, the temperature of the NOx catalyst 7, and the production amount of the intermediate products. In addition, FIG. 11 is a table that shows the relationship among an intake air amount Ga, the $NH_3$ adsorption rate, and a ratio of the intermediate products that pass through the NOx catalyst 7 with respect to the intermediate products that flow into the NOx catalyst 7.

The production amount of the intermediate products increases as the reducing agent amount that is supplied to the NOx catalyst 7. Further, the production amount of the intermediate products increases as the temperature of the NOx catalyst 7 decreases. FIG. 10 is a map that is made by obtaining those relationships in advance by experiment or the like. The production amount of the intermediate products can be obtained from the map, the reducing agent amount that is supplied to the NOx catalyst 7, and the temperature of the NOx catalyst 7.

Further, the intermediate products more easily pass through the NOx catalyst 7 because the flow rate of the exhaust increases as the intake air amount Ga increases. Moreover, the intermediate products more easily pass through the NOx catalyst 7 as the $NH_3$ adsorption rate increases. FIG. 11 is a map that is made by obtaining those relationships in advance by experiment or the like. The ratio of the intermediate products that pass through the NOx catalyst 7 with respect to the intermediate products that flow into the NOx catalyst 7 can be obtained from the map, the intake air amount Ga, and the $NH_3$ adsorption rate.

Figure 11:
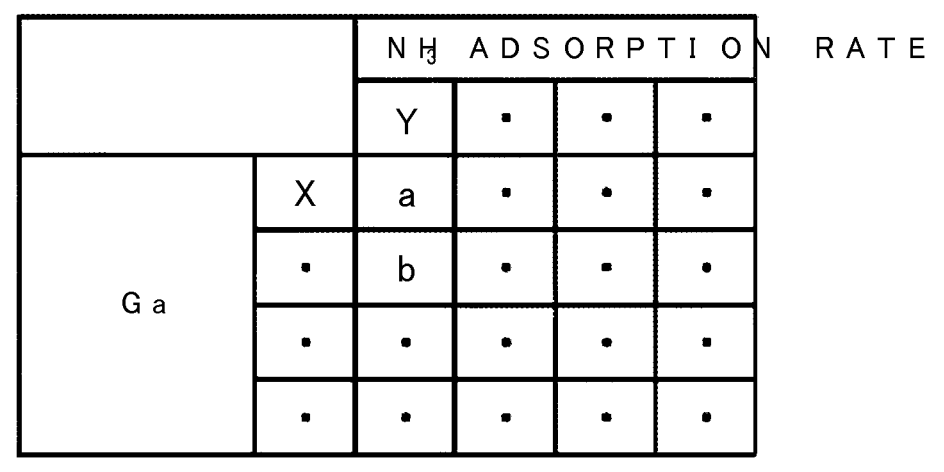

Then, the production amount of the intermediate products that can be obtained from the map shown in FIG. 10 is multiplied by the ratio of the intermediate products that pass through the NOx catalyst 7 that are shown in FIG. 11, and the amount of the intermediate products that passes through the NOx catalyst 7 can thereby be calculated. Further, on the assumption that the intermediate products that pass through the NOx catalyst 7 attach to the PM sensor 17 at a prescribed ratio, the amount of the intermediate products that attaches the PM sensor 17 can be calculated. If the amount of the intermediate products that attaches to the PM sensor 17 is equal to or larger than the threshold in step S107, the process moves to step S108, and the reducing agent removal process may be conducted. Further, a cumulative amount of the intermediate products that attach to the PM sensor 17 is calculated, a total amount of the intermediate products that attach to the PM sensor 17 can thereby be calculated. The cumulative amount of the intermediate products that pass through the NOx catalyst 7 may be calculated. If the cumulative value is equal to or larger than the threshold in step S107, the process moves to step S108, and the reducing agent removal process may be conducted.

Further, a determination may be made in step S107 whether or not at least one of the following conditions is satisfied that the flow rate or the flow speed of the exhaust that passes through the NOx catalyst 7 is equal to or higher than a threshold, that the temperature of the NOx catalyst or the temperature of the exhaust is equal to or lower than a threshold, and that the adsorption rate of $NH_3$ or the adsorption amount of $NH_3$ in the NOx catalyst 7 is equal to or larger than a threshold. The threshold can be obtained in advance by experiment or the like as values in a case where an influence on the detection value of the PM sensor 17 exceeds the allowable range.

As described above, according to the this embodiment, the reducing agent can be removed from the PM sensor 17 in a case where the accuracy of the detection value of the PM sensor 17 may decrease due to the reducing agent that attaches to the PM sensor 17. Accordingly, because a change in the detection value of the PM sensor 17 due to the reducing agent can be restricted, a decrease in the accuracy in the determination on trouble of the filter 5 can be restricted.

Second Embodiment

In the flow shown in FIG. 6, the reducing agent removal process is conducted when the estimation production amount QM is equal to or larger than the threshold. It can also be considered that the reducing agent removal process is conducted when the reducing agent amount that passes through the NOx catalyst 7 exceeds an allowable range. In contrast, in this embodiment, the reducing agent removal process is conducted in a case where the reducing agent passes through the NOx catalyst 7 independently from the amount of the reducing agent that passes through the NOx catalyst 7. For example, the reducing agent removal process is conducted in a case where at least one of the following conditions is satisfied that the flow rate or the flow speed of the exhaust that passes through the NOx catalyst 7 is equal to or higher than the threshold, that the temperature of the NOx catalyst or the temperature of the exhaust is equal to or lower than the threshold, and that the adsorption rate of $NH_3$ or the adsorption amount of $NH_3$ in the NOx catalyst 7 is equal to or larger than the threshold. The thresholds are set as values at which the reducing agent passes through the NOx catalyst 7. Other devices and the like are the same as the first embodiment, and the description will not be repeated.

Figure 12:
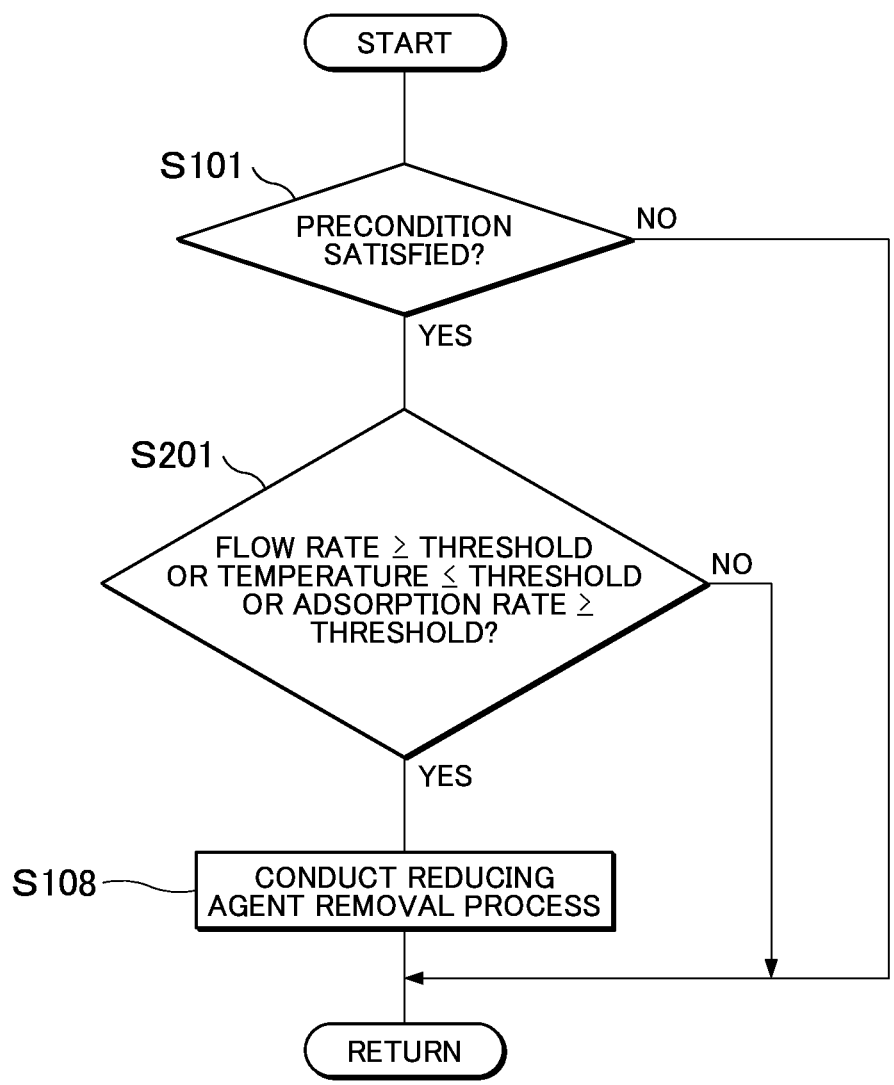
FIG. 12 is a flowchart that illustrates a flow of a reducing agent removal process in accordance with a second embodiment.

FIG. 12 is a flowchart that illustrates a flow of the reducing agent removal process in accordance with this embodiment. This routine is executed by the ECU 10 in each prescribed time Like reference numerals and symbols are given to steps where the same process as the flow shown in FIG. 6 is performed, and the description will not be repeated.

If an affirmative determination is made in step S101, the process moves to step S201. A determination may be made in step S201 whether or not at least one of the following conditions is satisfied that the flow rate or the flow speed of the exhaust that passes through the NOx catalyst 7 is equal to or higher than the threshold, that the temperature of the NOx catalyst 7 is equal to or lower than the threshold, and that the adsorption rate of $NH_3$ in the NOx catalyst 7 is equal to or higher than the threshold. The thresholds are in advance set as values at which the reducing agent passes through the NOx catalyst 7 by experiment or the like. The flow rate of the exhaust may be the flow speed of the exhaust or the intake air amount of the internal combustion engine 1. The temperature of the NOx catalyst 7 may be the temperature of the exhaust. The adsorption rate of $NH_3$ in the NOx catalyst 7 may be the adsorption amount of $NH_3$ in the NOx catalyst 7. A determination may be made in step S201 whether or not the reducing agent passes through the NOx catalyst 7.

Further, in step S201, the first coefficient K1, the second coefficient K2, and the third coefficient K3 are calculated in the same way as the flow shown in FIG. 6, and a determination may thereby be made whether or not any of those values is equal to or larger than the threshold. Moreover, a determination may be made whether or not a value obtained by multiplying at least two of the first coefficient K1, the second coefficient K2, and the third coefficient K3 is equal to or larger than a threshold. In addition, a determination may be made whether or not the passing-through coefficient RM that is calculated in step S105 is equal to or larger than the threshold value. The thresholds are in advance set as values at which the reducing agent passes through the NOx catalyst 7 by experiment or the like.

If an affirmative determination is made in step S201, the process moves to step S108. If a negative determination is made, this routine is finished.

In this embodiment, the ECU 10 that conducts the reducing agent removal process corresponds to the removal section in the present invention.

As described above, according to the this embodiment, the reducing agent removal process can be conducted in a case where the accuracy of the detection value of the PM sensor 17 may decrease due to the reducing agent that passes through the PM sensor 17. Accordingly, because a change in the detection value of the PM sensor 17 due to the reducing agent can be restricted, a decrease in the accuracy in the determination on trouble of the filter 5 can be restricted.

Third Embodiment

In this embodiment, a decrease in the detection value of the PM sensor 17 is added to conditions for conducting the reducing agent removal process other than the conditions described in the first and second embodiments. Other devices and the like are the same as the first embodiment, and the description will not be repeated.

Here, as shown in FIG. 5, if the PM sensor 17 is normal, the detection value increases along with the lapse of time or the detection value does not change unless the reducing agent removal process or a PM removal process is conducted. In other words, if the PM sensor 17 is normal, the detection value does not decrease along with the lapse of time. On the other hand, when the reducing agent attaches to the PM sensor 17, the detection value may decrease due to vaporization of the reducing agent.

Thus, a determination can be made that the reducing agent attaches to the PM sensor 17 in a case where the detection value of the PM sensor 17 decreases. For example, a determination is made that the reducing agent attaches to the PM sensor 17 if the present detection value of the PM sensor 17 is smaller than the previous detection value of the PM sensor 17. Further, a determination may be made that the reducing agent attaches to the PM sensor 17 in a case where a differential value of the detection value of the PM sensor 17 becomes a negative value, for example.

In this embodiment, for example, a determination is made in step S107 shown in FIG. 6 whether or not the estimation production amount QM is equal to or larger than the threshold QP and the detection value of the PM sensor 17 decreases. Further, for example, a determination is made in step S201 in FIG. 12 whether or not at least one of the following conditions is satisfied that the flow rate of the exhaust that passes through the NOx catalyst 7 is equal to or higher than the threshold, that the temperature of the NOx catalyst 7 is equal to or lower than the threshold, and that the adsorption rate of $NH_3$ in the NOx catalyst 7 is equal to or higher than the threshold, and whether or not the detection value of the PM sensor 17 decreases. In this embodiment, the ECU 10 that conducts the reducing agent removal process corresponds to the removal section in the present invention.

As described above, according to this embodiment, a determination on abnormality of the PM sensor 17 is made in consideration of the detection value of the PM sensor 17 in addition to the flow rate of the exhaust that passes through the NOx catalyst 7, the temperature of the NOx catalyst 7, and the adsorption rate of $NH_3$ in the NOx catalyst 7. Accordingly, the decrease in the accuracy of trouble of the filter 5 can further be restricted.

Fourth Embodiment

In this embodiment, a time in which the detection value of the PM sensor 17 reaches a specified value after the PM removal process is conducted is added to the conditions for conducting the reducing agent removal process other than the conditions described in the first and second embodiments. Other devices and the like are the same as the first embodiment, and the description will not be repeated.

Here, FIG. 13 is a time chart that represents variations of the detection values in cases where the detection value of the PM sensor 17 is normal and where the detection value of the PM sensor 17 is abnormal. Solid lines represent the normal cases where only the PM attaches to the PM sensor 17. One-dot chain lines represent the abnormal cases where the reducing agent attaches to the PM sensor 17.

When the reducing agent attaches to the PM sensor 17, the detection value of the PM sensor 17 increases. Thus, a degree of increase in the detection value is high in a case where the reducing agent attaches to the PM sensor 17 compared to a case where only the PM attaches to the PM sensor 17. A time at which the specified value is reached thus becomes short. Further, the cover that hinders water or the like from attaching to the pair of electrodes 171 may be mounted on the PM sensor 17. The cover is provided with a hole through which the exhaust flows. However, because it becomes difficult for the PM to reach the pair of electrodes 171 if the hole is blocked by the reducing agent, the increase in the detection value becomes slow. Then, the time in which the specified value is reached becomes long.

Accordingly, the time in which the detection value of the PM sensor 17 reaches the specified value has a normal range. It can be considered that the reducing agent attaches to the PM sensor 17 if the time in which the detection value of the PM sensor 17 reaches the specified value is shorter than the normal range or longer than that. As described above, a determination can be made whether or not the reducing agent attaches to the PM sensor 17 on the basis of the time in which the detection value of the PM sensor 17 reaches the specified value. The specified value is in advance set by obtaining an optimal value by experiment or the like.

For example, on the assumption that the filter 5 is not provided in an operational state where the largest amount of the PM is discharged from the internal combustion engine 1, the time in which the detection value of the PM sensor 17 reaches the specified value is set as a threshold. The threshold may be a lower limit value of an allowable range. Here, the solid line indicated by "normal limit" corresponds to the detection value of the PM sensor 17 on an assumption that the filter 5 is not provided in an operational state where the largest amount of the PM is discharged from the internal combustion engine 1, and a time point at which the solid line indicated by the normal limit reaches the specified value corresponds to the threshold. The assumption that the filter 5 is not provided in an operational state where the largest amount of the PM is discharged from the internal combustion engine 1 is a case where the amount of the PM that attaches to the PM sensor 17 becomes largest. In other words, if the time in which the detection value of the PM sensor 17 reaches the specified value in a circumstance where the amount of the PM that attaches to the PM sensor 17 is largest is set as the threshold, a determination can be made that the reducing agent attaches to the PM sensor 17 when an actual time is equal to or shorter than the threshold.

Further, for example, on the assumption that the reducing agent does not attach to the cover of the PM sensor 17, an upper limit value of the time in which the detection value of the PM sensor 17 reaches the specified value may be set as the threshold. The threshold may be an upper limit value of the allowable range. In other words, if the time in which the detection value of the PM sensor 17 reaches the specified value in a circumstance where the PM may attach to the pair of electrodes 171 is set as the threshold, a determination can be made that the reducing agent attaches to the cover of the PM sensor 17 when an actual time exceeds the threshold.

In this embodiment, for example, the ECU 10 counts a lapse of time after the PM removal process illustrated in FIG. 3. Further, a determination is made in step S107 shown in FIG. 6 whether or not the estimation production amount QM is equal to or larger than the threshold QP and the time in which the detection value of the PM sensor 17 reaches the specified value after the PM removal process is conducted is out of the allowable range. Further, determinations are made in step S201 in FIG. 12 whether or not at least one of the following conditions is satisfied that the flow rate of the exhaust that passes through the NOx catalyst 7 is equal to or higher than the threshold, that the temperature of the NOx catalyst 7 is equal to or lower than the threshold, and that the adsorption rate of $NH_3$ in the NOx catalyst 7 is equal to or higher than the threshold, and whether or not the time in which the detection value of the PM sensor 17 reaches the specified value after the PM removal process is conducted is out of the allowable range. In this embodiment, the ECU 10 that conducts the reducing agent removal process corresponds to the removal section in the present invention.

As described above, according to this embodiment, a determination on abnormality of the PM sensor 17 is made in consideration of the time in which the detection value of the PM sensor 17 reaches the specified value in addition to the flow rate of the exhaust that passes through the NOx catalyst 7, the temperature of the NOx catalyst 7, and the adsorption rate of $NH_3$ in the NOx catalyst 7. Accordingly, the decrease in the accuracy of trouble of the filter 5 can further be restricted.

Fifth Embodiment

In this embodiment, the temperature of the PM sensor 17 is further increased in a case where the detection value of the PM sensor 17 decreases when the reducing agent removal process is conducted compared to a case where the detection value does not decrease. Other devices and the like are the same as the first and second embodiments, and the description will not be repeated.

Here, it can be considered that the reducing agent attaches to the PM sensor 17 in a case where the detection value of the PM sensor 17 decreases when the temperature of the PM sensor 17 is increased to 360° C. or higher, for example. In other words, it can be considered that the reducing agent vaporizes and the detection value of the PM sensor 17 decreases due to an increase of the temperature of the PM sensor 17 to 360° C. or higher, for example.

In such a case, the temperature of the PM sensor 17 is further increased, and the removal of the reducing agent can quickly be completed. This enables an early determination on trouble of the filter 5.

Figure 14:
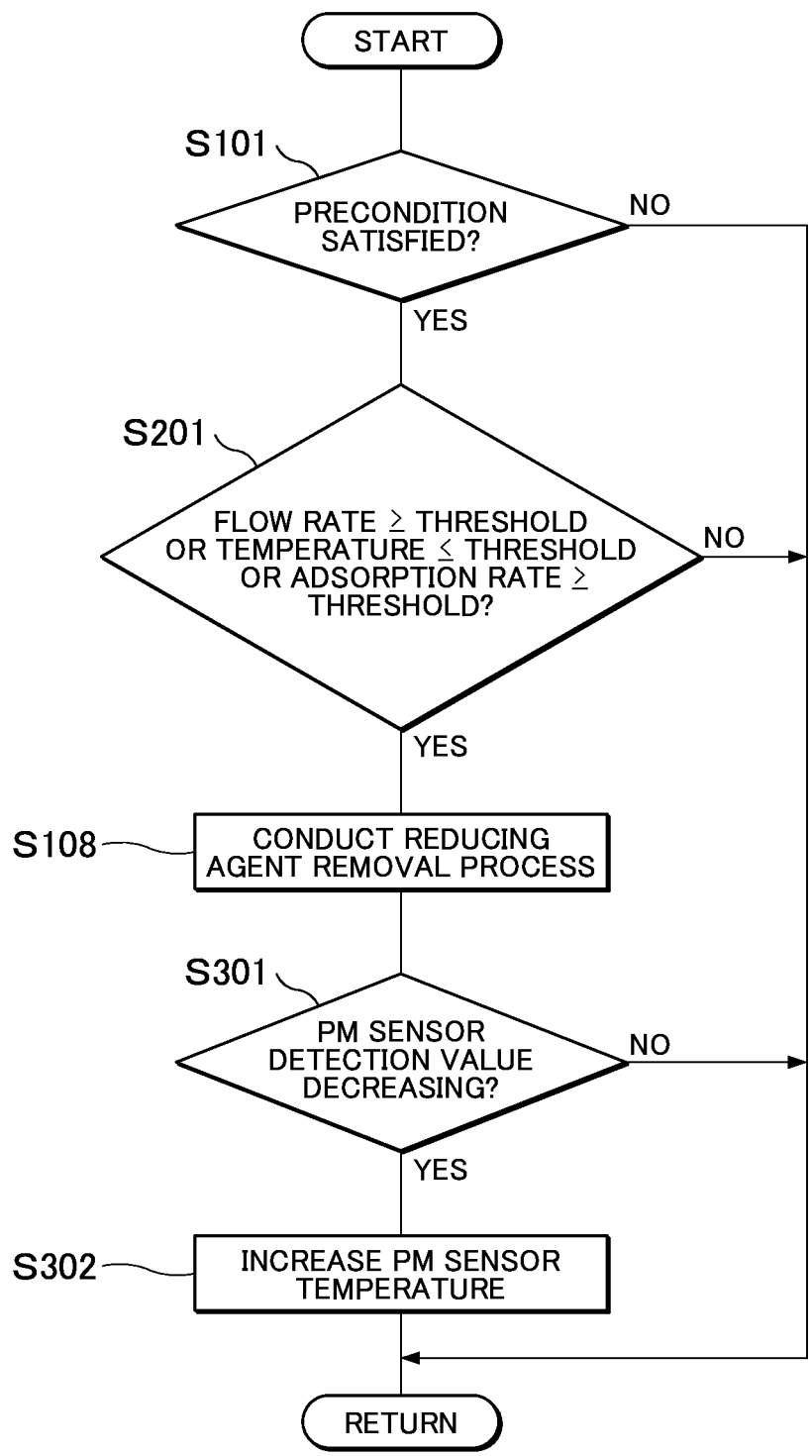
FIG. 14 is a flowchart that illustrates a flow of a reducing agent removal process in accordance with a fifth embodiment.

FIG. 14 is a flowchart that illustrates a flow of the reducing agent removal process in accordance with this embodiment. This routine is executed by the ECU 10 in each prescribed time Like reference numerals and symbols are given to steps where the same process as the flow shown in FIG. 12 is performed, and the description will not be repeated.

In step S108, the temperature of the PM sensor 17 is increased to 360° C., for example, to conduct the reducing agent removal process. This temperature is set as a temperature at which the reducing agent vaporizes but the PM does not oxidize.

A determination is made in step S301 whether or not the detection value of the PM sensor 17 decreases. Here, even if the temperature of the PM sensor 17 is increased to 360° C., for example, the PM that attaches to the PM sensor 17 is not oxidized. Thus, it can be considered that the reducing agent attaches to the PM sensor 17 in a case where the detection value of the PM sensor 17 decreases. In other words, a determination is made in this step whether or not the reducing agent actually attaches to the PM sensor 17. Here, because only a determination is made in step S201 whether or not a condition that the reducing agent can attach to the PM sensor 17 is satisfied, this does not necessarily mean that the reducing agent actually attaches to the PM sensor 17. On the other hand, a determination can be made in this step whether or not the reducing agent actually attaches to the PM sensor 17.

If an affirmative determination is made in step S301, the process moves to step S302. If a negative determination is made, the reducing agent removal process is performed while the temperature set in step S108 is maintained.

The temperature of the PM sensor 17 is increased in step S302. In this step, the temperature of the PM sensor 17 is increased to 600° C., for example, to conduct the reducing agent removal process. In other words, the temperature of the PM sensor 17 is increased from 360° C., for example, to 600° C., for example. Accordingly, vaporization of the reducing agent that attaches to the PM sensor 17 can be facilitated, and the reducing agent can quickly be removed from the PM sensor 17.

The process from step S301 in accordance with this embodiment can be performed in the same way after step S108 of the flow shown in FIG. 6. Because only a determination is made in the flow shown in FIG. 6 whether or not the condition that the reducing agent can attach to the PM sensor 17 is satisfied, this does not necessarily mean that the reducing agent actually attaches to the PM sensor 17. On the other hand, a determination can be made whether or not the reducing agent actually attaches to the PM sensor 17 by performing the process from step S301 after step S108.

As described above, according to this embodiment, because the temperature of the PM sensor 17 is further increased in the reducing agent removal process when the reducing agent attaches to the PM sensor 17, the reducing agent can quickly be removed from the PM sensor 17. Accordingly, the determination on trouble of the filter 5 can quickly be performed. Meanwhile, when the reducing agent does not attach to the PM sensor 17, the temperature of the PM sensor 17 is not increased in the reducing agent removal process, degradation of the NOx catalyst 7, the oxidation catalyst 4, and the sensor can thus be restricted.

Further, the reducing agent removal process is conducted by increasing the temperature of the exhaust by supplying HC to the oxidation catalyst 4. In this case, fuel efficiency may be lowered due to fuel consumption. However, the supply amount of HC is small when the reducing agent does not attach to the PM sensor 17, and lowering of the fuel efficiency can be restricted.

DESCRIPTION OF REFERENCE NUMERALS AND SYMBOLS

1: INTERNAL COMBUSTION ENGINE
2: INTAKE PASSAGE
3: EXHAUST PASSAGE
4: OXIDATION CATALYST
5: FILTER
6: INJECTION VALVE
7: SELECTIVE REDUCTION TYPE NOx CATALYST
10: ECU
11: AIR FLOW METER
12: FIRST EXHAUST TEMPERATURE SENSOR
13: SECOND EXHAUST TEMPERATURE SENSOR
14: THIRD EXHAUST TEMPERATURE SENSOR
15: FIRST NOx SENSOR
16: SECOND NOx SENSOR
17: PM SENSOR
18: ACCELERATOR OPERATION AMOUNT SENSOR
19: CRANK POSITION SENSOR

The invention claimed is:

1. An exhaust purification device for an internal combustion engine, the device comprising:
    an exhaust passage that receives exhaust from the internal combustion engine;
    a filter that is provided in the exhaust passage and that collects particulate matters in the exhaust;
    a selective reduction NOx catalyst that is provided in the exhaust passage downstream of the filter and that reduces NOx by a supplied reducing agent;
    a supply device that supplies the reducing agent to the selective reduction NOx catalyst, the reducing agent being supplied from upstream of the selective reduction NOx catalyst and downstream of the filter in the exhaust passage;
    a PM sensor that detects an amount of the particulate matters in the exhaust at a location downstream of the selective reduction NOx catalyst in the exhaust passage; and
    an electronic control unit configured to control a process for removing the reducing agent that attaches to the PM sensor by increasing a temperature of the PM sensor based on a determination that at least one of the following conditions is satisfied:
    (a) a temperature of the selective reduction NOx catalyst is equal to or lower than a threshold, the temperature of the selective reduction NOx catalyst being received by the electronic control unit from a selective reduction NOx catalyst temperature sensor that directly detects the temperature of the selective reduction or that is provided in the exhaust passage downstream of the filter and upstream of the PM sensor,
    (b) a temperature of the exhaust is equal to or lower than a threshold, the temperature of the exhaust gas being received by the electronic control unit from an exhaust gas temperature sensor provided in the exhaust passage,
    (c) a flow rate of the exhaust is equal to or higher than a threshold, the flow rate of the exhaust being received by the electronic control unit from a flow meter, or
    (d) an adsorption amount of the reducing agent in the selective reduction NOx catalyst is equal to or larger than a threshold, the adsorption amount of the reducing agent being calculated by the electronic control unit based on an amount of the reducing agent that passes through the selective reduction type NOx catalyst.

2. The exhaust purification device for the internal combustion engine according to claim 1, wherein
the electronic control is configured to calculate the amount of the reducing agent that passes through the selective reduction NOx catalyst according to at least one of: the temperature of the selective reduction NOx catalyst or the temperature of the exhaust, the flow rate of the exhaust, and the adsorption amount of the reducing agent in the selective reduction NOx catalyst, and
that at least one of the conditions (a), (b), (c) or (d) is satisfied and
is a case where that the amount of the reducing agent that passes through the selective reduction NOx catalyst is equal to or larger than a threshold.

3. The exhaust purification device for the internal combustion engine according to claim 1, wherein the electronic control unit is configured to control the process for removing the reducing agent that attaches to the PM sensor based on the determination that at least one of the conditions (a), (b), (c) or (d) is satisfied and based on a determination that a detection value of the PM sensor decreases.

4. The exhaust purification device for the internal combustion engine according to claim 1, wherein the electronic control unit is configured to control the process for removing the reducing agent that attaches to the PM sensor based on the determination that at least one of the conditions (a), (b), (c) or (d) is satisfied and based on a determination that a time in which a detection value of the PM sensor becomes equal to or larger than a specified value after the process for removing the particulate matters that attach to the PM sensor is conducted is equal to or shorter than a threshold.

5. The exhaust purification device for the internal combustion engine according to claim 1, wherein the electronic control unit is configured to control the process for removing the reducing agent that attaches to the PM sensor by increasing a temperature of the PM sensor to a first temperature value that is 360° C. or higher.

6. The exhaust purification device for the internal combustion engine according to claim 5, wherein, upon increasing the temperature of the PM sensor to the first temperature value that is 360° C. or higher, the electronic control unit is further configured to determine whether a detection value of the PM sensor decreases and to increase the temperature of the PM to a higher temperature.

7. The exhaust purification device for the internal combustion engine according to claim 1, wherein the electronic control unit increases the temperature of the PM sensor reducing agent that attaches to the PM sensor is increased by increasing the temperature of the exhaust.

8. The exhaust purification device for the internal combustion engine according to claim 7, wherein the electronic control unit increases the temperature of the exhaust by supplying HC to the oxidation catalyst or by discharging a higher temperature gas from the internal combustion engine.

9. The exhaust purification device for the internal combustion engine according to claim 1, wherein the electronic control unit discharges the higher temperature gas from the internal combustion engine, the higher temperature gas being heated by a heater.

* * * * *